US012596878B1

(12) United States Patent
Tsao

(10) Patent No.: US 12,596,878 B1
(45) Date of Patent: Apr. 7, 2026

(54) SYSTEM FOR INFERRING SALIENCY IN A MULTIVARIATE TIME SERIES DERIVED FROM PERIODIC CONVERSATION WITH FINE-TUNED LARGE LANGUAGE MODEL

(71) Applicant: Anson An-Chun Tsao, Redmond, WA (US)

(72) Inventor: Anson An-Chun Tsao, Redmond, WA (US)

(*) Notice: Subject to any disclaimer, the term of this patent is extended or adjusted under 35 U.S.C. 154(b) by 0 days.

(21) Appl. No.: 18/441,970

(22) Filed: Feb. 14, 2024

Related U.S. Application Data

(60) Provisional application No. 63/445,491, filed on Feb. 14, 2023.

(51) Int. Cl.
*G06F 17/00* (2019.01)
*G06F 40/295* (2020.01)

(52) U.S. Cl.
CPC ................................. *G06F 40/295* (2020.01)

(58) Field of Classification Search
None
See application file for complete search history.

(56) References Cited

U.S. PATENT DOCUMENTS

| | | | |
|---|---|---|---|
| 10,296,724 B2 * | 5/2019 | Mehmet | G16H 20/30 |
| 10,984,041 B2 | 4/2021 | Bedadala et al. | |
| 2004/0162724 A1 | 8/2004 | Hill et al. | |
| 2005/0010416 A1 * | 1/2005 | Anderson | G16H 40/63 704/271 |
| 2014/0278513 A1 * | 9/2014 | Prakash | G06Q 30/0601 705/2 |
| 2016/0012194 A1 * | 1/2016 | Prakash | G06Q 30/0601 705/2 |
| 2020/0126667 A1 | 4/2020 | Sheffer et al. | |
| 2020/0281485 A9 | 9/2020 | Valys et al. | |
| 2020/0322361 A1 * | 10/2020 | Ravindra | G06F 40/279 |
| 2021/0264480 A1 * | 8/2021 | Silverstein | H04L 67/02 |

FOREIGN PATENT DOCUMENTS

| | | |
|---|---|---|
| CN | 105894088 B | 6/2018 |

OTHER PUBLICATIONS

Healthily—The self-care app (Your.MD), www.livehealthily.com. https://www.livehealthily.com/app [Date accessed: Feb. 14, 2023].

* cited by examiner

*Primary Examiner* — Satwant K Singh
(74) *Attorney, Agent, or Firm* — Bold IP, PLLC; Christopher Mayle

(57) ABSTRACT

A system and method that generates and stores a multivariate time series of the user's conditions and activities, based on the interpretation of the user's natural language input through trained AI including large language models. This time series serves as a comprehensive record of the user's well-being and provides the foundation for the system's ability to identify the factors that most significantly impact the user's desired outcome. By tracking and analyzing the relationships between the various conditions and activities, the system can determine the key drivers of the outcome of interest to the user and provide insights into how to improve and maintain overall well-being.

15 Claims, 17 Drawing Sheets

Patent Citations

| Patent # | Filled | Published | Title |
|---|---|---|---|
| US20050010416A1 | 2004-06-07 | 2005-01-13 | System and method for self management of health using natural language interface |
| US20200281485A9 | 2019-09-24 | 2020-09-10 | Machine learning health analysis with a mobile device |
| CN105894088B | 2016-03-25 | 2018-06-29 | Based on deep learning and disturbed semantic feature medical information extraction system and method |
| US10984041B2 | 2018-05-10 | 2021-04-20 | Natural language processing integrated with database and data store management |
| US20200126667A1 | 2013-09-05 | 2020-04-23 | Automated clinical indicator recognition with natural language processing |
| US20040162724A1 | 2003-02-11 | 2004-08-19 | Management of conversations |

FIG. 6

Goal Input

Journal Entry

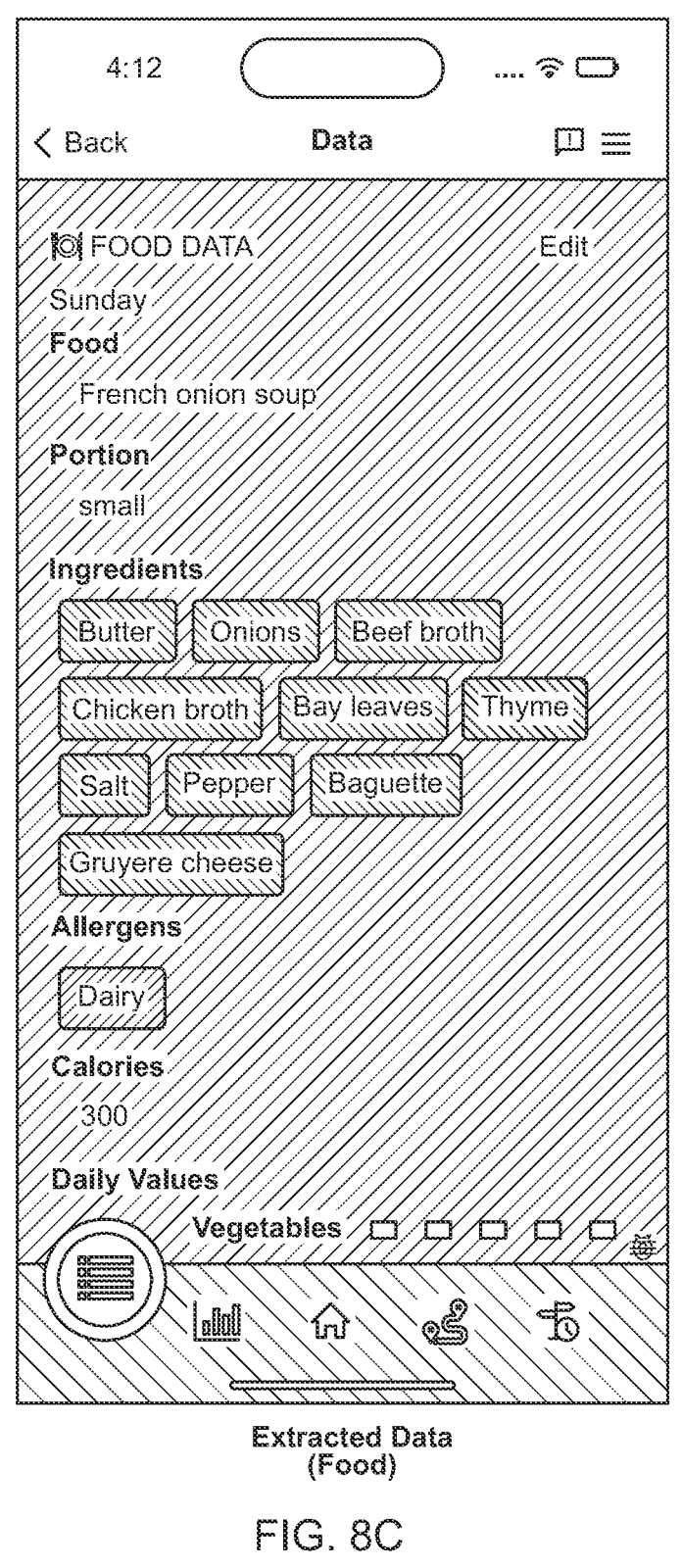

4:12

< Back        Data

⊡ FOOD DATA                    Edit

Sunday
Food

French onion soup

Portion small

Ingredients

Butter    Onions    Beef broth

Chicken broth    Bay leaves    Thyme

Salt    Pepper    Baguette

Gruyere cheese

Allergens

Dairy

Calories

300

Daily Values

Vegetables  ☐ ☐ ☐ ☐ ☐

Extracted Data
(Food)

FIG. 8C

Extracted Data
(Exercise)

Visualization
(Symptoms)

SYSTEM FOR INFERRING SALIENCY IN A MULTIVARIATE TIME SERIES DERIVED FROM PERIODIC CONVERSATION WITH FINE-TUNED LARGE LANGUAGE MODEL

CROSS REFERENCE TO RELATED APPLICATIONS

This application claims priority to U.S. Provisional Patent Application No. 63/445,491 filed on Feb. 14, 2023.

FIELD OF DISCLOSURE

The present invention relates to self-monitoring of chronic physical or emotional conditions and overall well-being. This invention utilizes artificial intelligence to analyze the natural language input from a user and mathematical/computational models to interpret the resulting multivariate time-series data. This allows for the identification of the underlying factors and patterns that have the greatest impact on the user.

BACKGROUND

The increasing focus on self-awareness regarding physical and emotional health has led to a greater desire among individuals to actively manage and enhance their well-being. Traditional methods like journaling or the use of wearable technology often offer a limited scope, capturing only a specific set of data, which narrows the understanding of one's holistic health.

For instance, the U.S. Patent Publication 20200281485A9 illustrates the use of machine learning for health analysis via mobile devices. This involves continuous monitoring of health indicators like PPG signals, heart rate, and blood pressure. However, its limitation lies in focusing solely on physiological parameters, necessitating the user to have a physical monitoring device. Furthermore, it lacks the ability to provide context or capture the user's subjective perceptions about their health, daily activities, and lifestyle choices, which are also crucial for overall well-being.

Similarly, the mobile application 'Healthily' by Your.MD exemplifies another health-tracking method. It permits users to log their daily health in a few preset categories with space for additional notes. Yet, this app does not analyze the context of these notes or assist in interpreting health trends or patterns, limiting its effectiveness.

Commonly, traditional health monitoring methods depend on fixed categories and frameworks, which might not comprehensively represent an individual's unique experiences. This indicates a need for a novel approach that allows individuals to document their daily experiences, feelings, conditions, and activities in their own words, free from the constraints of predefined categories and frameworks. Such a method would offer a more in-depth, personalized insight into an individual's health, aiding them in better understanding and improving their physical and emotional well-being over time.

Recent developments in artificial intelligence and language comprehension have opened up new possibilities for gathering detailed personal information using natural language and conversational user interfaces. This method provides a user-friendly and intuitive way for individuals to convey their complete daily experiences and thoughts, thereby revolutionizing the convenience and depth of personal health monitoring.

SUMMARY

The present invention introduces a user-friendly conversational interface that allows individuals to document their daily experiences and activities. Users engage with an AI chatbot in a natural, conversational manner or through chronological journal entries, detailing their present and past activities and experiences in everyday language.

Utilizing named entity recognition, the system transforms the user's narratives into a detailed multivariate time series. This compilation includes various aspects such as emotional states, physical conditions, daily activities, sleep quality, dietary habits, and more. The richness of this data can be enhanced with information from external sources like weather conditions, air quality, medical test results, or physical activity data, and others obtained through third-party integrations. To optimize data collection and clarity, a conversational director component of the system steers the dialogue, seeking additional details and clarifications from the user.

Self-monitoring system 100 utilizes a large language model with and without fine-tuning to interpret user input of goals, conditions, and activities to generate predefined fields and novel fields, Self-monitoring system 100 selects specialized prompts/fine-tuned LLM or external APIs to interpret or augment different entity types. Self-monitoring system 100 allows reinterpretation of previous entries as more advanced models are introduced. Self-monitoring system 100 allows the addition of $3^{rd}$ party specialized prompts/fine-tuned LLM or external APIs to individual users. Self-monitoring system 100 enables the user to modify previously captured named entity structure with additional natural language input.

Additionally, the system encompasses a predictive model tailored to analyze time series data focused on outcomes that the user is interested in. This model aids in identifying correlations, significant factors, and underlying trends within the time series. As a result, it offers a deeper, more personalized insight into the individual's overall health and well-being.

BRIEF DESCRIPTION OF DRAWINGS

The present invention will be described by way of exemplary embodiments, but not limitations, illustrated in the accompanying drawings in which like references denote similar elements, and in which:

FIG. 6 illustrates a time and topic-aware pipeline to extract data from journal entries

FIGS. 8A-8F show examples of visualization user interfaces.

DETAILED DESCRIPTION

Figure 1:
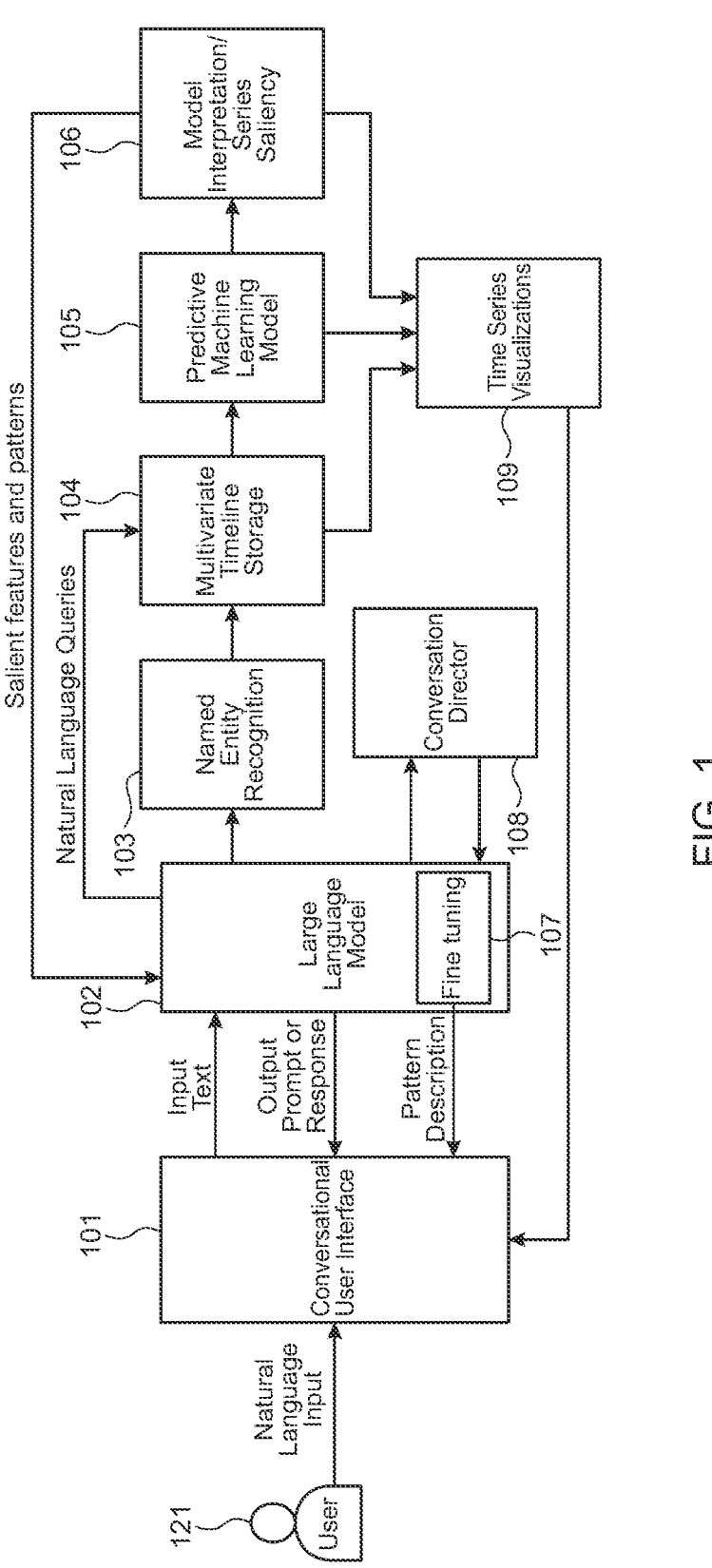
FIG. 1 shows an embodiment of a method for capturing natural language input to generate a multivariate time-series and the generation of an interpretable time-series model.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

Self-health tracking has grown in popularity as a means for people to oversee their mental and physical health, including the management of chronic conditions. By regularly documenting and analyzing various health aspects and daily routines, individuals gain a nuanced and tailored perspective on their health. This process enables them to pinpoint and comprehend the elements and trends influencing their overall wellness.

Presently health tracking tools often necessitate the use of specific equipment or manual data entry into pre-set categories, which can be cumbersome. This demands the adoption of new habits for effective use of these tools. Moreover, these systems typically lack the adaptability needed to encompass a broad spectrum of activities or conditions affecting a person's health.

This invention is centered on the use of a carefully designed series of prompts, examples, and fine-tuning, along with user text entries, as inputs to a generative pre-trained transformer (GPT) large language model, which will be discussed later. It capitalizes on the ease and familiarity of chatting, akin to daily interactions with friends and family, allowing users to describe their daily lives, thoughts, and emotions in their own words. This approach utilizes recent breakthroughs in large language AI models to parse and organize the user's input into meaningful named entities. The advanced language models in this system are capable of autonomously creating these entities, offering a straightforward, intuitive approach to self-health tracking.

The invention creates and stores a comprehensive time series from user inputs, reflecting their conditions and activities. This time series acts as an extensive log of the user's health status, laying the groundwork for the system to identify key factors affecting the user's targeted outcomes. By examining the interplay between various conditions, thoughts, feelings, and activities, the system discerns the principal factors influencing the desired results, offering insights on enhancing and sustaining overall well-being.

Figure 3:
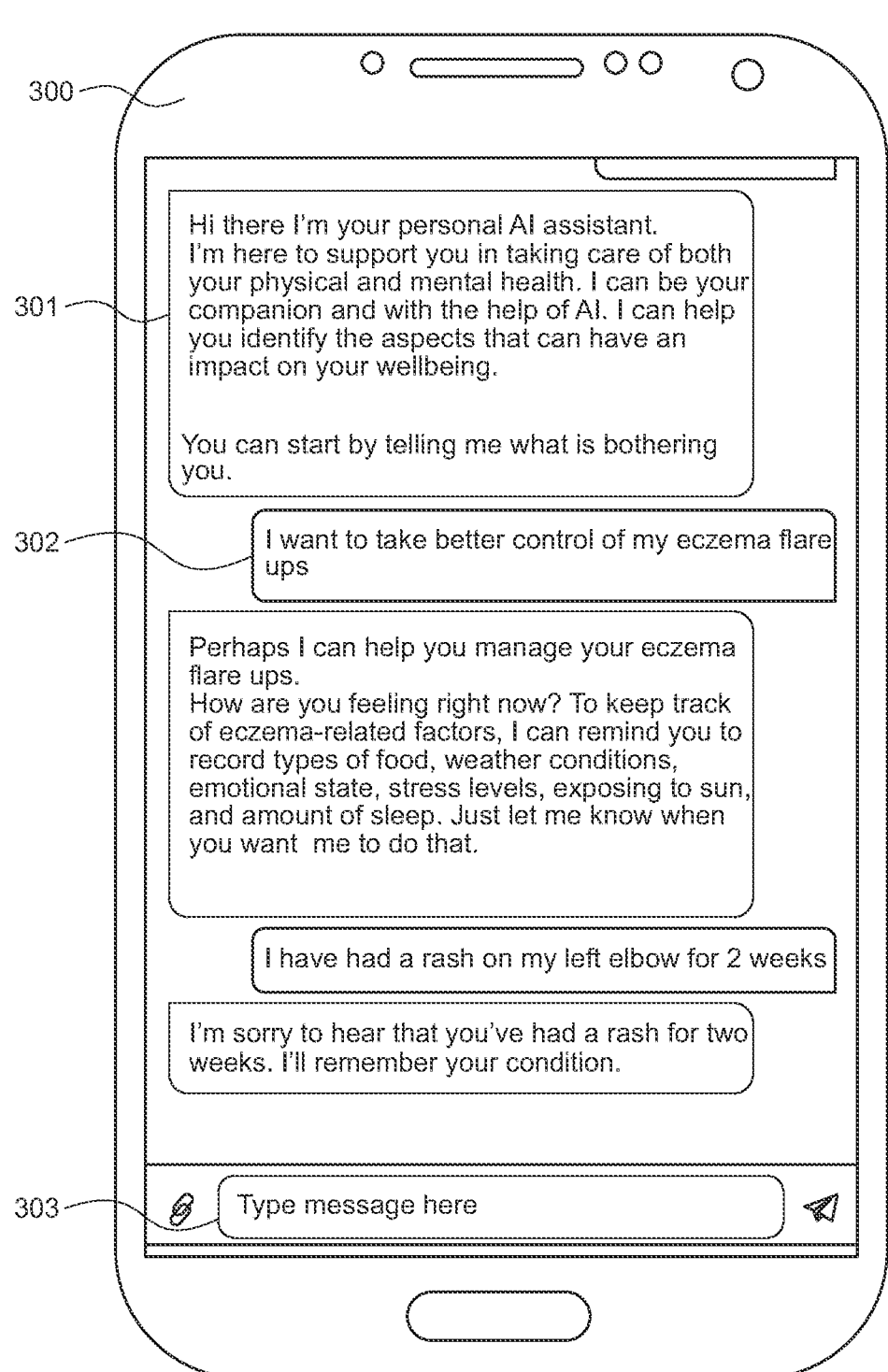
FIG. 3 shows an example user interface of the system interacting with the user.

Referring to FIG. 1, the diagram presents a block representation of an example of the current invention, the self-monitoring system 100. This system can be accessed by a user 121 through a user interface 101, using a user computing device 300, as shown in FIG. 3. The user computing device 300 may be any type of device equipped with computing capabilities. This includes, but is not limited to, devices featuring non-transitory computer-readable storage mediums and one or more processors capable of executing the steps of the invention. Examples of such devices are personal computers, desktop computers, laptops, notebooks, tablets, smartphones, and other devices that align with the concept of the Internet of things.

User interface 101 may have a plurality of buttons or icons that are selectable by user 121 to perform particular processes in response to the selections as well as audio and visual inputs captured by a camera or microphone. User Interface 101 may have conventional GUI interface devices such as a title bar, text boxes, toolbars, pull-down menus, tabs, scroll bars, context help, dialog boxes, operating buttons (icons), and status bar that enable user navigation throughout the display.

Figure 5:
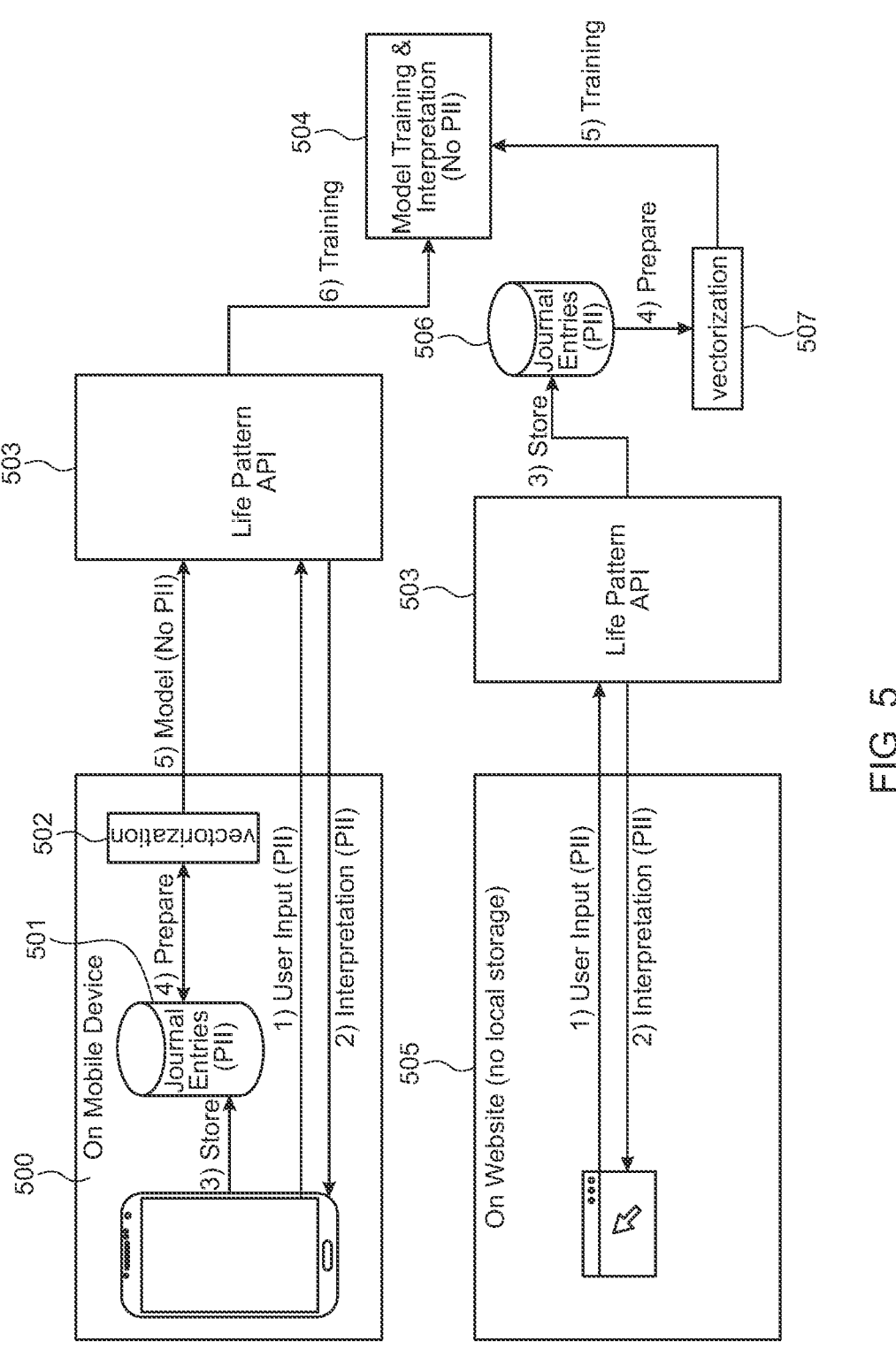
FIG. 5 shows where Personally Identifiable Information (PII) data is stored and flows through the system.
Figure 7A:
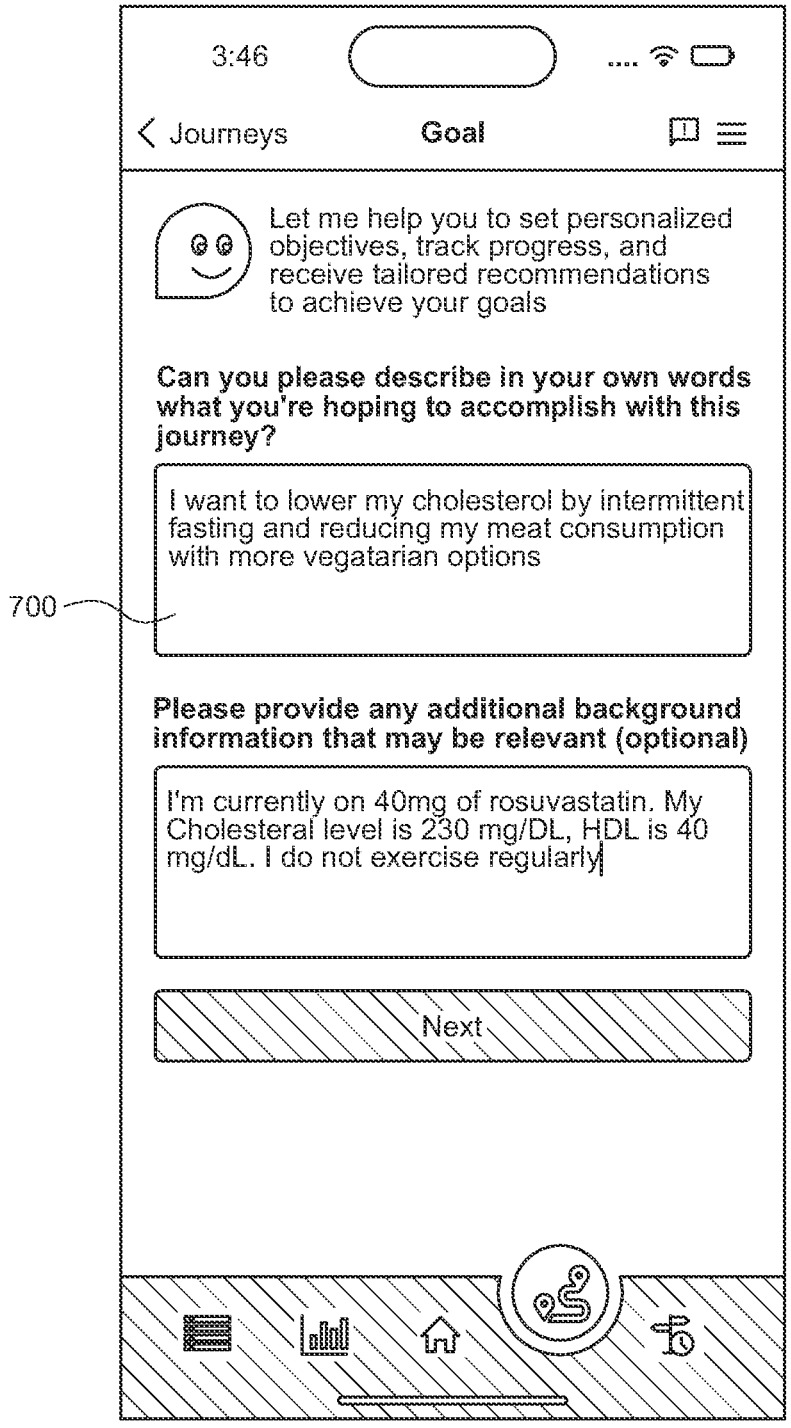
FIGS. 7A-7D show an example of the goal-gathering user interface.
Figure 7B:
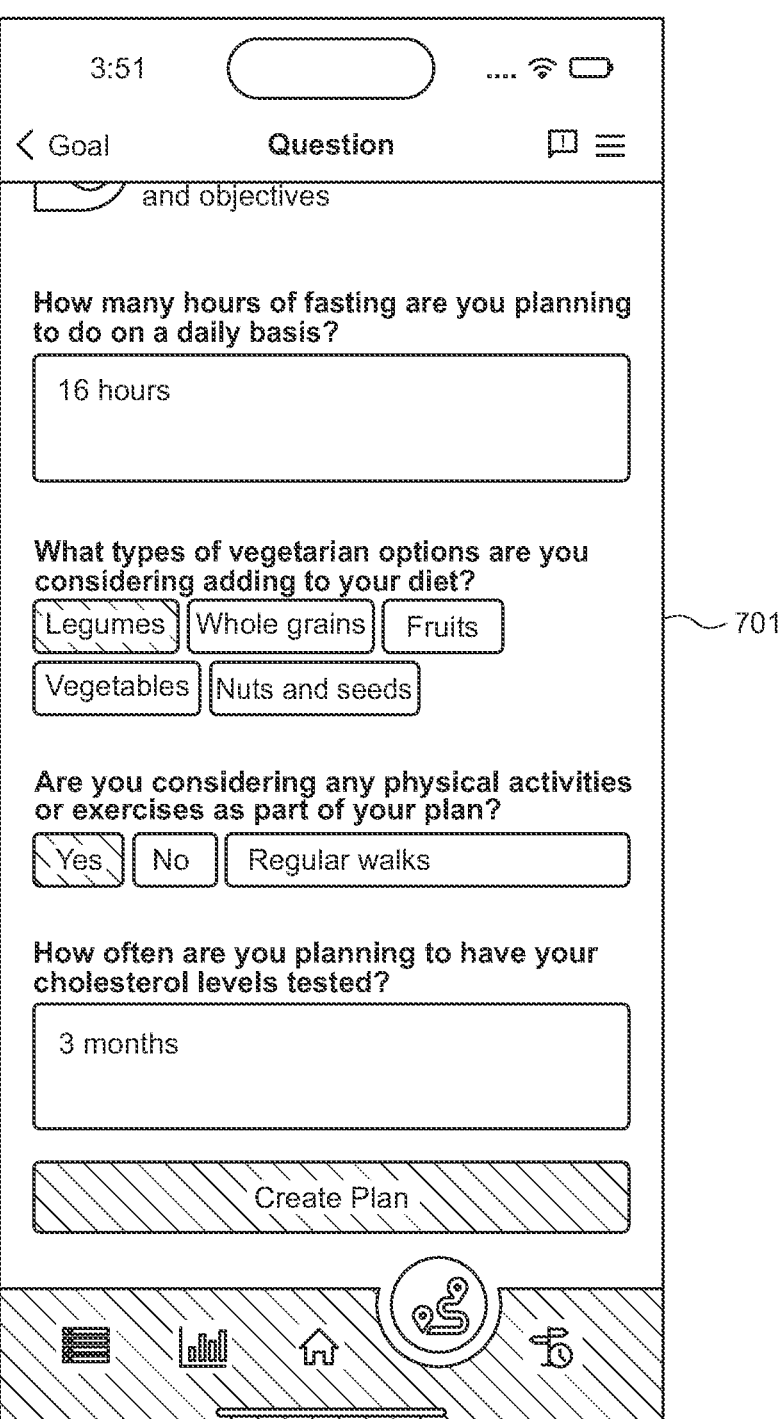
Figure 7C:
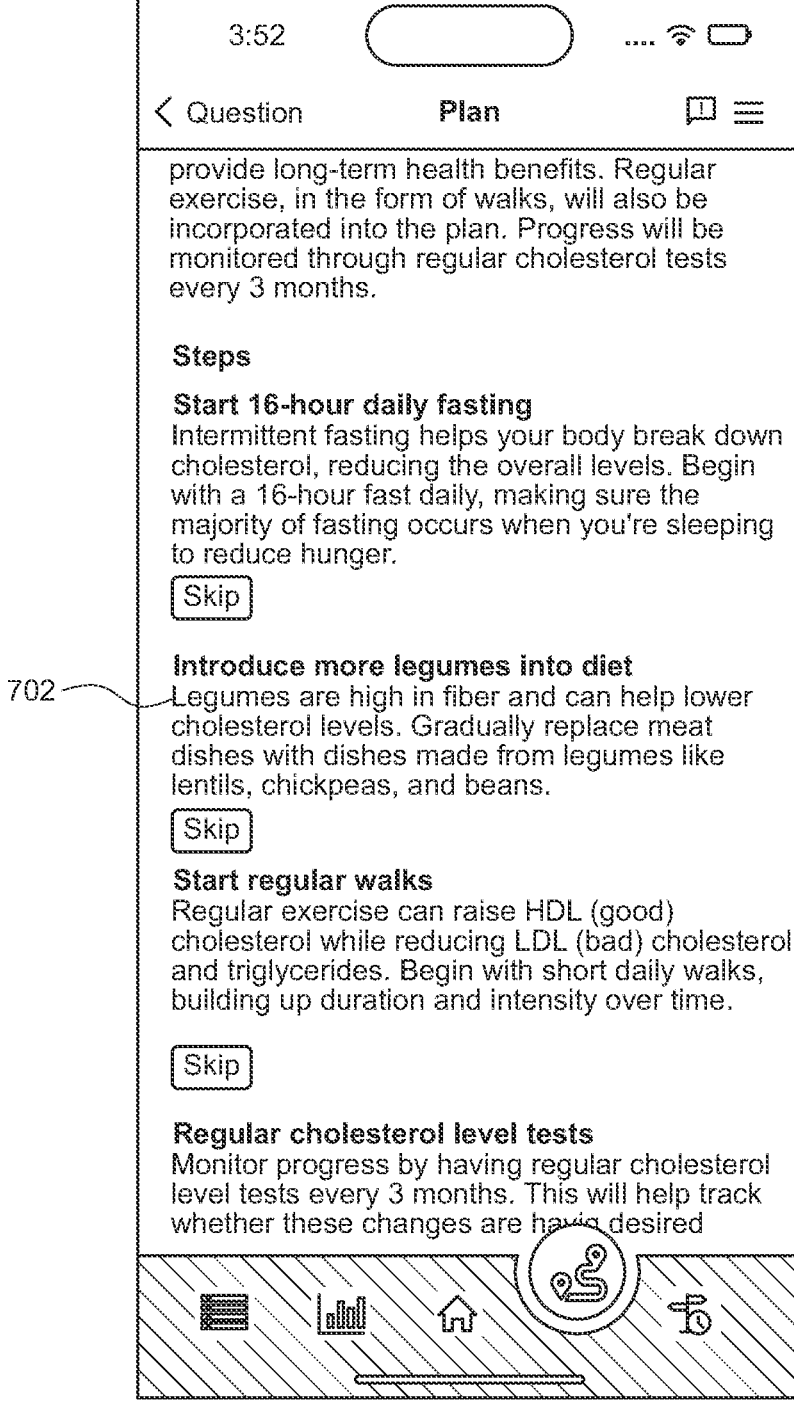
Figure 7D:
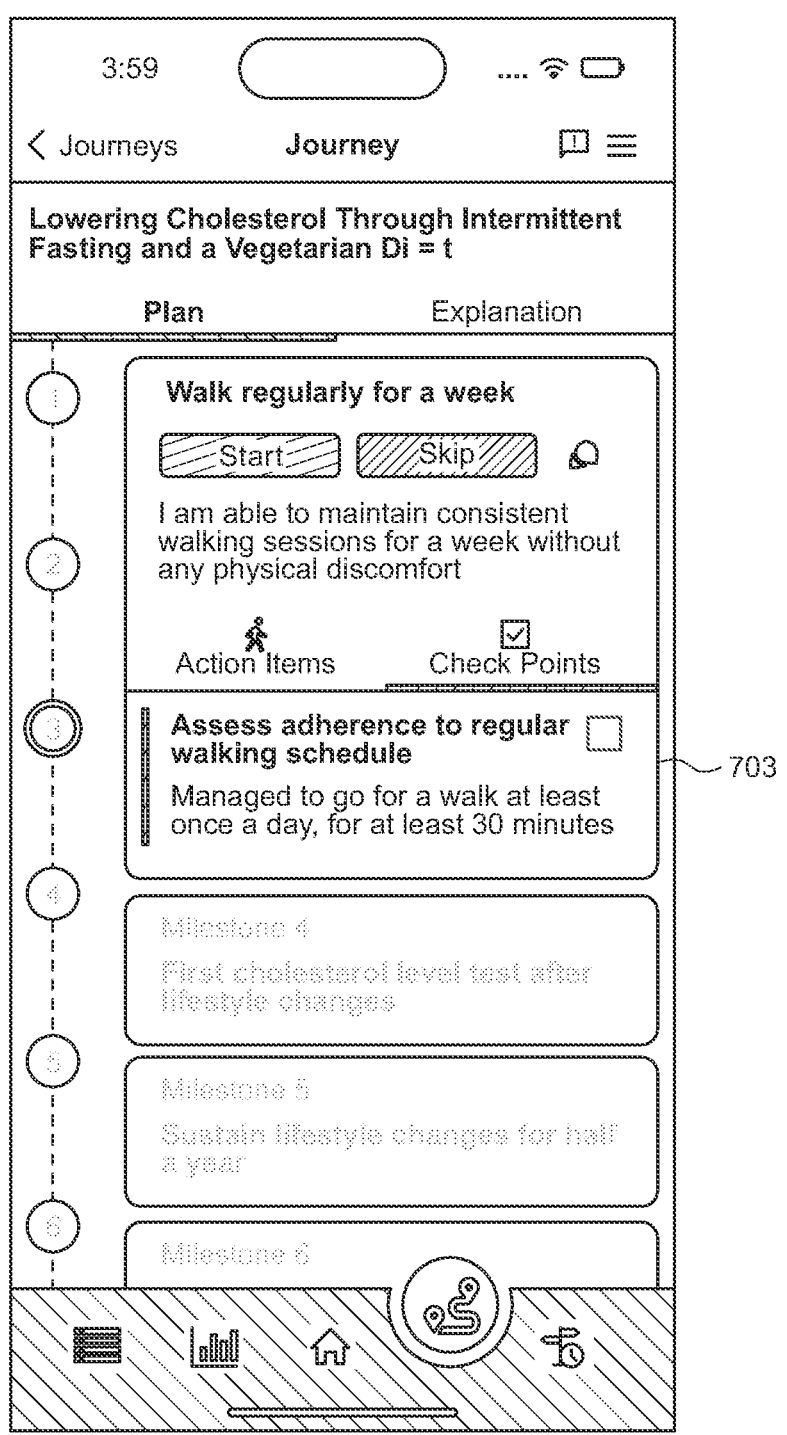
Figure 8A:
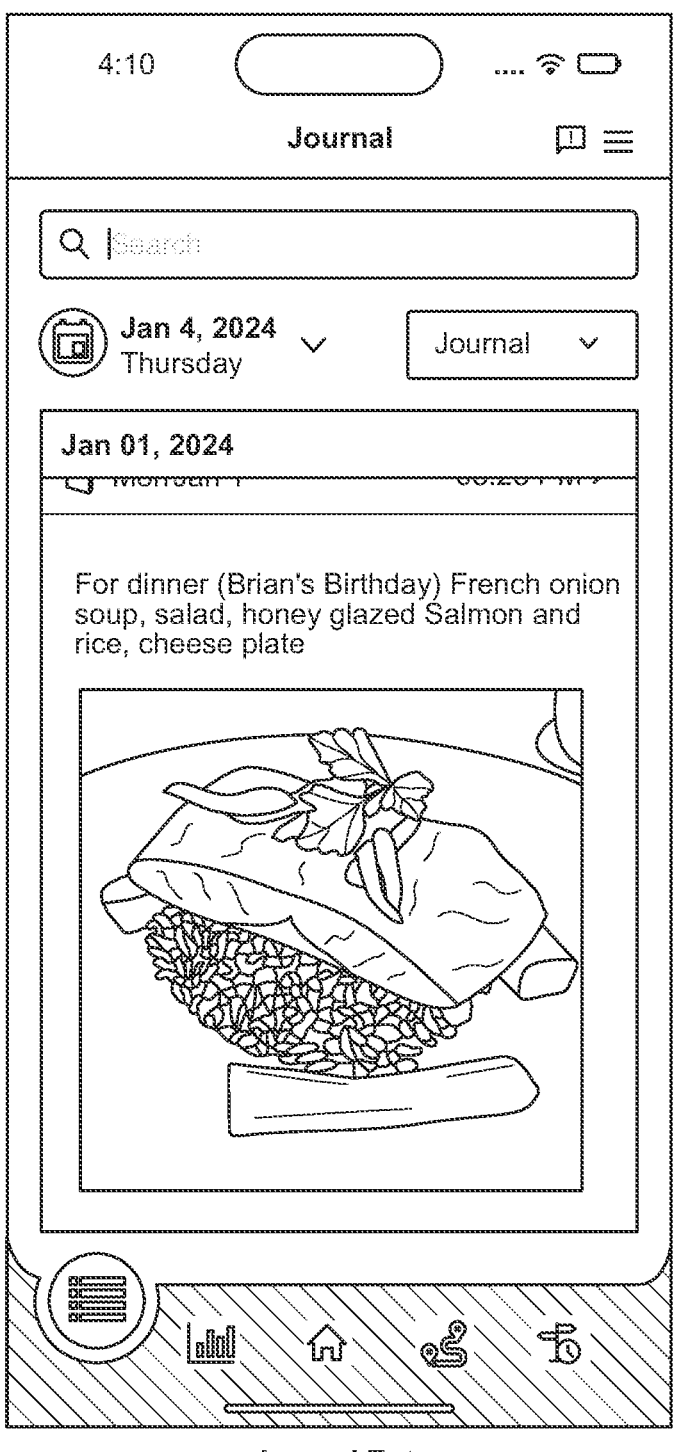
Figure 8B:
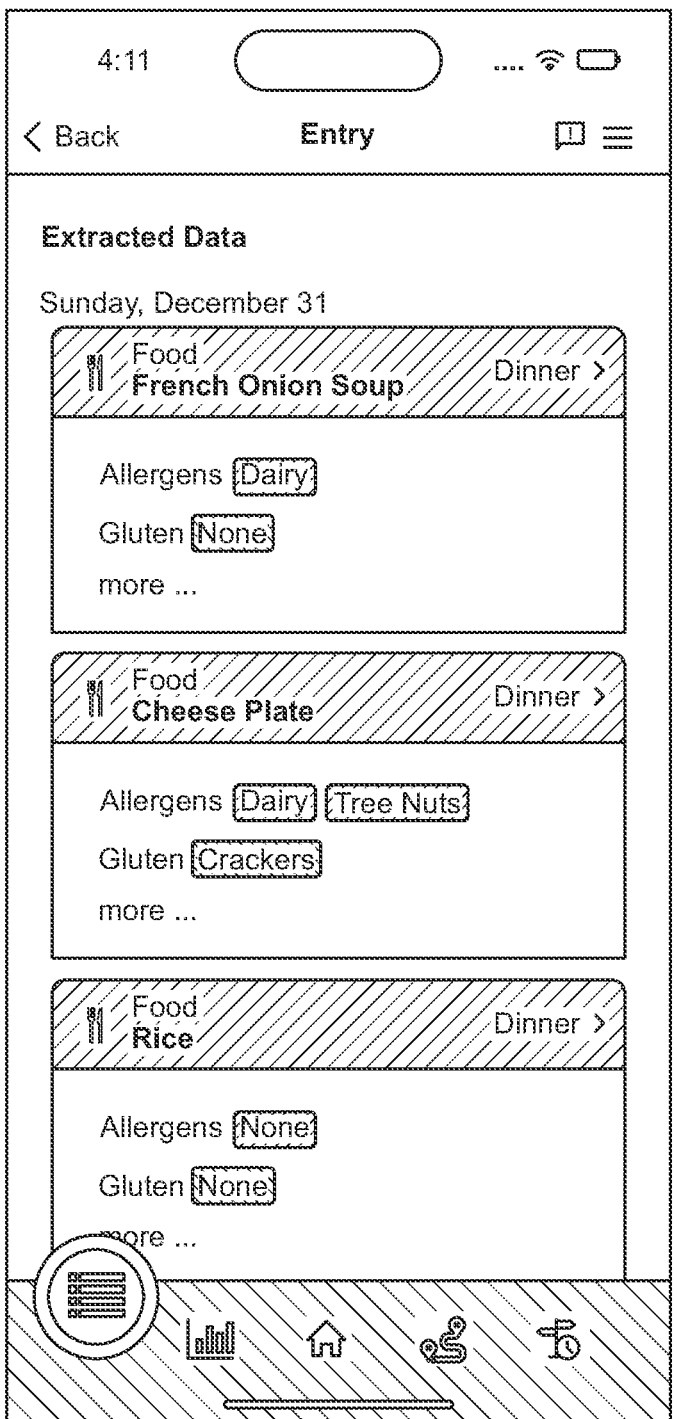
Figure 8D:
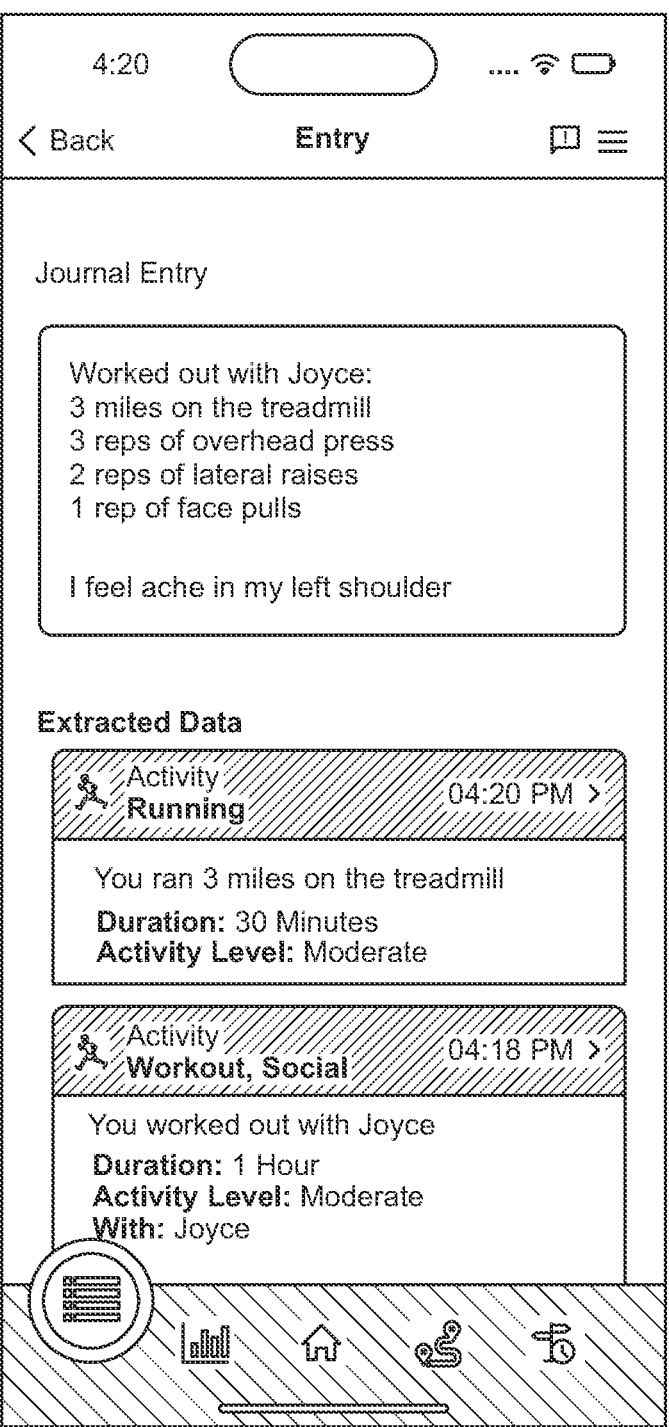
Figure 8E:
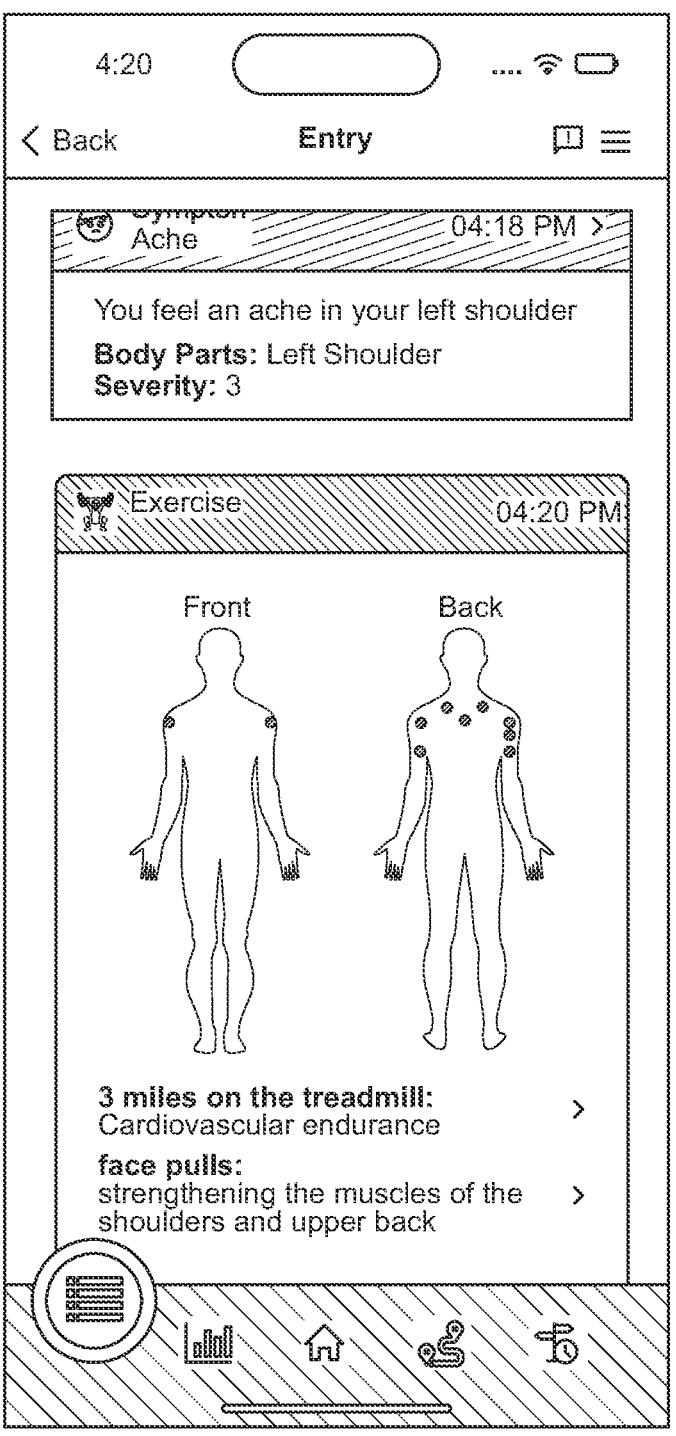
Figure 8F:
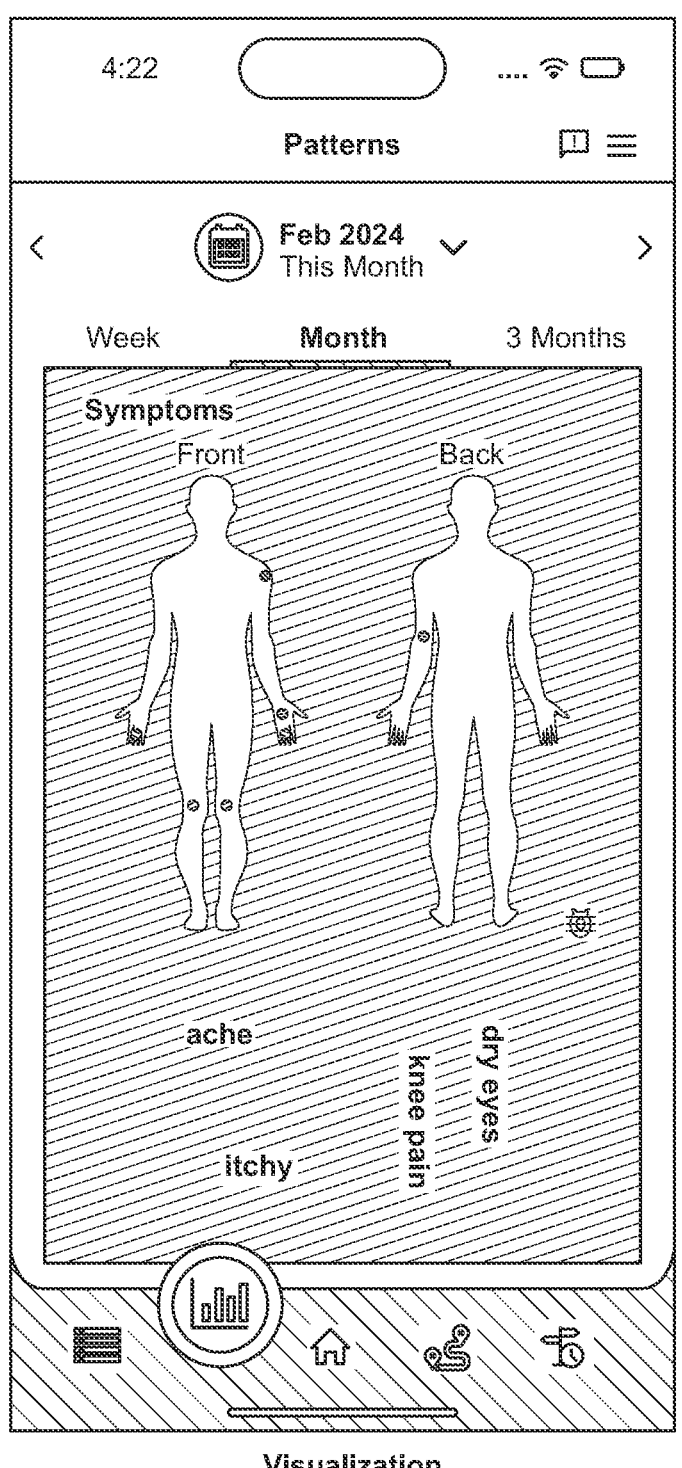

As illustrated in FIG. 5, user 121 may access self-monitoring system 100 in a multitude of ways including by a web browser to navigate to a web client 505 whereby data pertaining to the user data may be stored on one or more databases such as a cloud or by downloading an application associated with self-monitoring system 100 whereby data pertaining to the user is stored locally. For instance, self-monitoring system 100 may include a centralized web service 503 that may be connected to over a network, mobile application(s) 500 with local storage, and/or web client 505 with no local storage.

Web service 503 may provide an authenticated API to interpret the natural language input from the user. This may be inputted by text as well as audio, photos, or video. Journal entries and current interaction state may be stored long-term on journal entries storage 506. Once personal data is stored the data may then be converted into numerical vectors at block 507 that may be used for various machine learning and computer vision tasks at block 504 to further train self-monitoring system 100 while allowing the time-series model to be computed without any personally identifiable data, as the journal entries are vectorized into numeric data before being transmitted to the server for training. This ensures that the user's privacy is protected, while still allowing the system to provide valuable insights and personalized recommendations based on their self-monitoring data.

As discussed the user has the choice to refrain from saving their personal journal entries on a centralized server, opting instead to use their own user computing device 300 for storage. In such instances, the journal entries and the current state of interaction are preserved long-term in the journal entry storage 501 on the user's own computing device 300. This ensures that personal data is kept private. Subsequently, the stored data can be transformed into numerical vectors at block 502 within the same user computing device 300, which can then be utilized for training purposes at block 504. In further embodiments, Self-monitoring system 100 may optionally support device local only models 508, 509. These models are more limited but support PII data stored only on the local device, with no external transfer. There are 2 types of models involved: 1) Large Language model for chat response and data extraction 508, and 2) device-optimized ML models for inferring salient features 509.

The engagement between the user and the self-monitoring system 100 is primarily driven through two key conversational flows. Initially, the system gathers profile details and goals from the user. In regular interactions thereafter, the user is encouraged to input data such as thoughts, feelings, dietary intake, activities, and conditions. Depending on the user's profile and goals, the system might also generate targeted questions to further refine the data collection. Once sufficient data is collected, the system can attempt to infer the salient factors that most impact the user's goal.

As illustrated in FIGS. 7A-7D, self-monitoring system 100 asks the user to describe their goal for managing their condition and their current situation 700, using this information, self-monitoring system 100 asks additional clarifying questions 701 and then identifies topics to periodically track 702. Using the identified topics and tracking frequency, self-monitoring system 100 prompts the user for input.

These topics of interest may be modified based on ongoing input in conversations and journal entries in the second phase which is the ongoing tracking phase when the user can input ad hoc journal entries as well as engage in conversation with the chatbot whereby the system, for instance, may assess adherence to a schedule at 703. This allows the user to capture their conditions anytime they want, and at times the chatbot will prompt the user for input, or ask for clarification or elaboration. E.g., to remind the user to write about their meals or sleep, follow up on a previous negative event, or ask the user to elaborate on the portion sizes of meals.

User 121 may provide entries or responses by text or by audio or video whereby self-motivation system 100 may process audio and video data from user computing device 300 using an audio and video module. The audio module may include, among other modules or components for processing audio data, speech detection and recognition modules, and codecs for processing incoming or outgoing audio data. The video module may include image recognition modules for use in detecting speech and appropriate codecs for use in processing incoming or outgoing video data. Similarly, self-motivation system 100 may respond by generating text, audio, or video depending on the user's preferences and settings.

Figure 2:
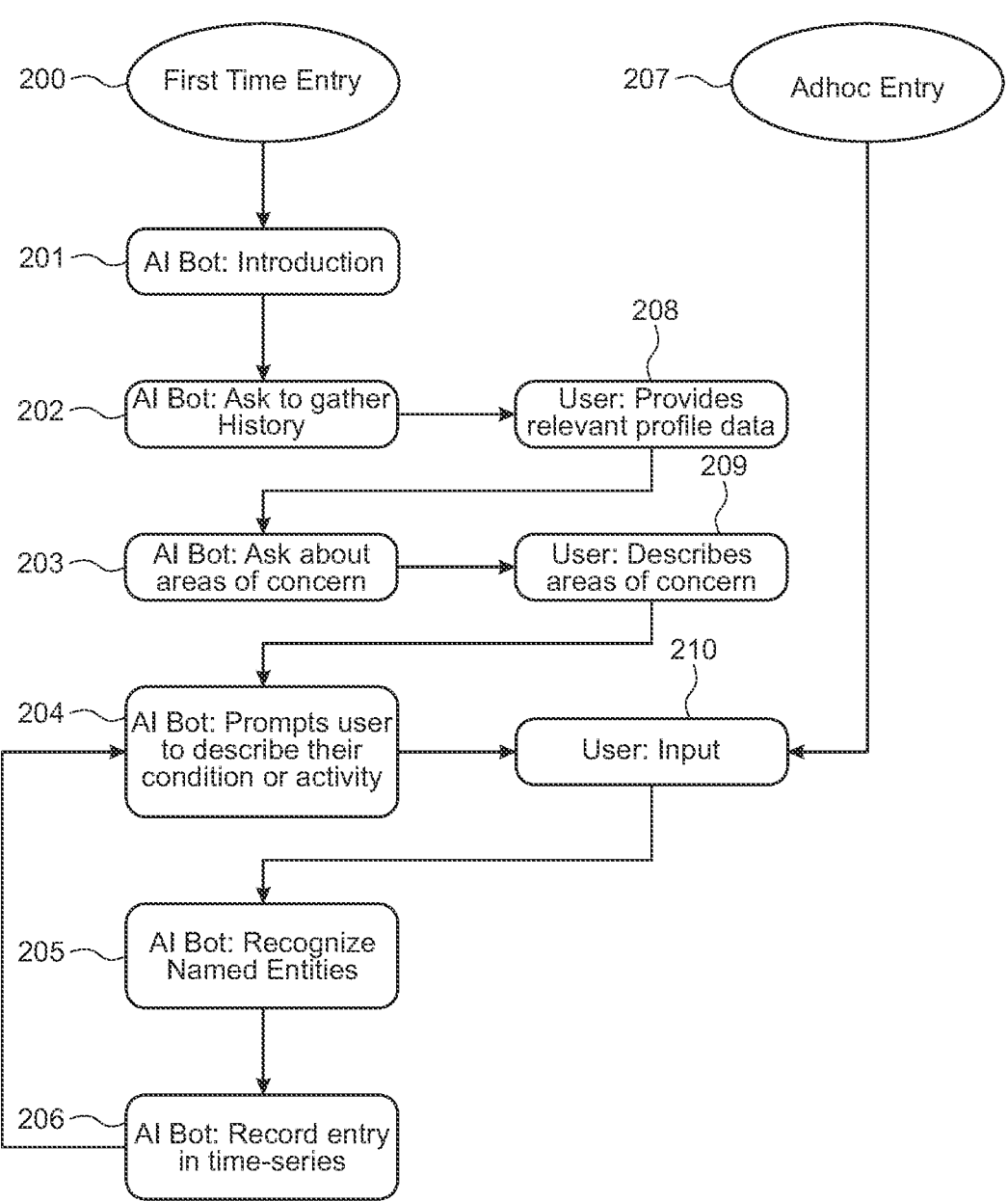
FIG. 2 shows an embodiment of the core interaction loop between the system (AI chatbot) and the user to generate the time series.

This concept is illustrated in FIG. 2, whereby the first sequence (profile phase 200) is dedicated to gathering profile information from the user, with the focus being on gaining an understanding of the user's primary areas of concern. The first sequence is fully guided by AI chatbot 201 possibly with interspersed data form entry. For example, when the chatbot asks the user to describe a goal 203, 302, 700, the chatbot will generate a list of questions 701 for the user to elaborate on the goals, like what success looks like to them, or whether they are open to professional help, etc.

The questions collect important information in order to acquire better guidance in relation to the needs of the users 121 and what they are trying to accomplish. The questions may include a question about the user's history at block 202 whereby user 121 may provide relevant profile data at block 208. The questions may include a question about the user's areas of concern at block 203 whereby the user may provide relevant profile data at block 209. The questions may include a question about the user's condition or activities at block 204 whereby user 121 may provide relevant profile data at block 210. AI chatbot 201 may also ask for any more information from user 121 if further data is required. An example of a conversational flow between user 121 and AI chatbot 201 is illustrated in FIG. 3, whereby user interface 101 displays received messages from AI chatbot 201 at 301, and response messages by user 121 at 302 using a text input window at 303.

Figure 4:
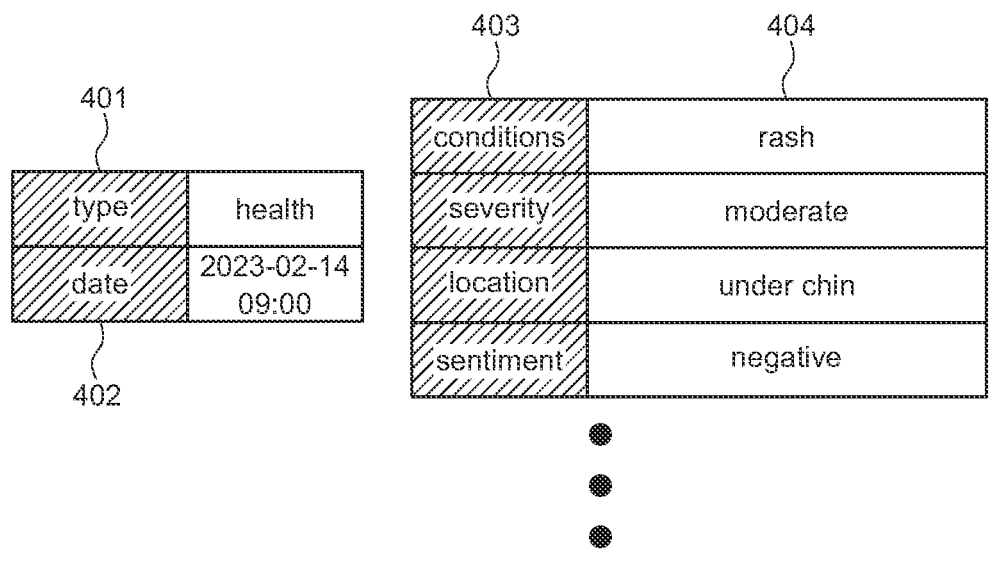
FIG. 4 shows an example named entity structure derived from user input.

During the second phase, upon completion of the initial sequence user 121 after connecting with self-motivation system 100 may be presented a user interface screen to provide updates to their lives including thoughts, feelings, dietary intake, activities, and conditions in a similar manner to the initial setup. Journal entries may be standalone whereby user 121 inputs a single event or in some embodiments user 121 may also be guided into a conversational flow (tracking phase 204, 207, 901) that encourages them to provide regular input on their activities and overall well-being in their daily life. As the tracking phase progresses, the system categorizes and structures the user's responses into a multi-level hierarchical format 400-404, as illustrated in FIG. 4 and FIG. 6, including the time and potential duration of the activity or condition 402 that has been entered by user 121. This information is derived 601 from the current time of interaction and additional contextual details provided by the user in their input.

When the interpreted results are relevant to the AI chatbot 201 earlier prompts at blocks 202, 203, 204, and 301, the interpreted data 400-404 may be further process the journal entries into a time-series format, reminders for future prompts, accumulated goals that serve as a basis for analysis, or remembered entities that provide additional contextual information.

The top tier of the structure is about the journal itself. The subsequent layers, the second 403 and third 404 tiers, encompass aspects like meals, physical activities, emotions, sleep patterns, medications, exercises, and so forth. Other tiers if present are further details about the topic or relationship between the topics. For example, the top layer is the extracted metadata about the journal entry itself: e.g., location, time of entry, topics of the entry, sentiment, associated photos, etc. The second layer is the chronological entries of the per-topic extracted entities, e.g., meals, activities, etc. Other layers are specific to the topic if they exist.

These named entities 403, 607 may represent single or multiple attributes 404, and their classifications are not rigidly pre-established and may be well-known/predefined fields as well as novel fields that are interpreted from the entry. The system 904 is crafted to autonomously generate new classifications for the novel fields through the large language model, while still favoring the recognition of standard categories. Based on the initial categorization 602, specific models may be chosen. An individual record may trigger multiple specialized models to parse and distill information.

For example, for food: the system may infer (not exclusively) ingredients, allergens, gluten, alcohol, caffeine, and nutritional daily values (e.g., protein, fat, carbs, etc.). For exercise: the system may infer purpose, cardio/strength, body parts affected, muscles, joints, tendons, etc. For activities: the system may infer participants, duration, injury likelihood, body parts impacted, indoor/outdoor, etc. For health: the system may infer symptoms, medication, diagnosis, and measurement, each with additional details. Self-monitoring system 100 may also collect user responses or data from third-party sources such as a fitness tracking application or social media sites.

Self-monitoring system 100 may incorporate additional time series (such as weather, holidays, air-quality, etc.) data outside user entries to compute saliency. The time series may adjust for location or time zone to align with the user's daily routines. Specifically, the models may be trained with an adjusted time series using the event's local time instead of GMT. For example, a user may be traveling, therefore their meal and activities may be modeled using their local time rather than GMT (Greenwich Mean Time).

Self-monitoring system 100 may capture additional data into the time series, such as data from health tracking devices, GPS location, photos, etc.

In addition to generating entries for the time series (journal entry storage 501, 506), the user's input can also be interpreted in several other ways. These include:

Reminders for future activities or events (reminders): The system can use the user's input to create reminders for activities or events that they have mentioned.

Descriptions of goals or conditions (goals): The user's input can also be used to describe their goals or conditions, which will influence what they want to track. FIGS. 7A-7D for instance illustrates an interaction with AI chatbot, whereby based on these interactions, the system will set up daily check-ins for 16-hour fasting, prompt for meal tracking, prompt to track activities, etc.

Non-time based entities (contextual): The input can also include non-time based entities that provide additional context, such as location, people, relationships, or other contextual details. Some of these concepts are illustrated in FIGS. 8A-8F.

Common commands: The user's input can include common commands for the system, such as requests to forget previous entries, requests for help, and others. In this way, the system can not only track the user's activities and well-being, but also provide additional functionality and context to enhance their experience. User may be able to search the entries using but not limited to a fuzzy full-text search, the determined metadata, a semantic search (search by meaning/relevance) using computed embeddings of the entry, a field-level queries of extracted data, or by time or place. For example, if the user wrote about having a pumpkin latte in a journal entry, later, the user may ask if they had cinnamon even though they never explicitly stated the recipe of pumpkin spice latte because it was a determined ingredient of the pumpkin spice latte.

Self-monitoring system 100 may utilize a time and topic-aware pipeline to extract data from journal entries as illustrated in FIG. 6. The process involves initially segmenting a journal entry 604 based on the referenced time in relation to the present moment. Subsequently, data from each segmented portion of the entry 605 are analyzed by specialized models or prompts 606 designed to extract pertinent information. These data extraction models are selected based on relevance to the analyzed text.

A first example would be I had lasagna for dinner and my stomach was bloated in ½ hour and I am angry at myself for not avoiding dairy. This may be separated into 2 time entries 605, 1) I had lasagna for dinner (typically 6 pm), 2) my stomach was bloated in ½ hour (after dinner) and I am angry at myself. The lasagna entry is interpreted by the food specialization prompt model: extracting information such as ingredients, gluten, and allergens. The stomach entry is interpreted by the symptoms model 606, extracting information such as symptoms, affected area, and severity, as well as the mood emotion specialization model, extracting information such as time, emotion, and trigger. These models then suggest additional follow-up questions for the user to enter optional additional details.

Another example would be, I played golf yesterday afternoon, and I have elbow pain. This may be separated into 2 time entries, 1) for playing golf yesterday afternoon (estimated between 1-5), 2) left elbow pain (today-current time)—The golf entry is then interpreted by the activity and exercise models: extracting information such as body parts impacted, injury likelihood, cardio, in/outdoor, etc. —The elbow pain entry is then interpreted by the symptoms model.

Self-monitoring system 100 may enhance data extraction by including recent journal entries to enrich the context for data extraction, incorporating previously documented personal objectives and aspirations, and including supplementary personal information and profile details.

After the initial creation of an entry, the user has the option to make updates, additions, or deletions to the entry using either a traditional form-based user interface or through natural language input. This allows the user to provide additional data or clarify existing information, as well as make any necessary changes to the entry.

Self-monitoring system 100 may have a conversational director (CD) 108 that is the subsystem that manages the sequencing of prompts and responses from the AI chatbot. CD 108 is based on a finite state-machine where events are driven by the interpretation of the user's input and time-based prompts that are initiated based on the type of information the user wants to track and reminders they have entered. This allows the system to provide a personalized and dynamic conversational experience for the user. CD 108 may be used to fine tune large language models 102 to perform well on a specific task or domain related to user 121 whereby large language models 102 are further trained (fine-tuned) on the specific dataset.

CD 108 may have a series of states that represents a specific condition or situation in the system such as "Idle" and "Processing Input". CD 108 may be triggered by the user's input. For example, when a user inputs or asks for information and transitions from one state to another, triggered by events. For instance, receiving user input while in the "Idle" state may transition the FSM to the "Processing Input" state. Actions: Actions are processes or outputs that occur in response to events. For example, fetching information, or issuing a notification.

The system offers three primary methods for the user to gain insights from their journal entries while interacting with CD 108 These may include:

Time series visualizations 109 whereby self-monitoring system 100 provides graphical representations of the sentiment of the user's entries and the frequencies of various activities or conditions on user interface 101, allowing the user to quickly gain a visual overview of their self-monitoring data.

Natural language query using large language models 102 and multivariate timeline storage 104 whereby self-monitoring system 100 allows the user to search for or ask questions about specific information or timeframe within their journal using natural language queries similar to entering journal entries. This provides a flexible and intuitive way for the user to access their data. Self-monitoring system 100 may summarize results by searching through the data with natural language processing techniques, self-monitoring system 100 identifies the key elements within the relevant to the user's query. Self-monitoring system 100 synthesizes the retained key elements into a coherent summary. Summaries may also be a textual answer to the query, a list of relevant entries, and/or a summary visualization such as muscle groups activated when user 121 was performing a specific exercise may be presented on a human diagram or a word-cloud of ingredients of something they ate earlier.

Figure 9:
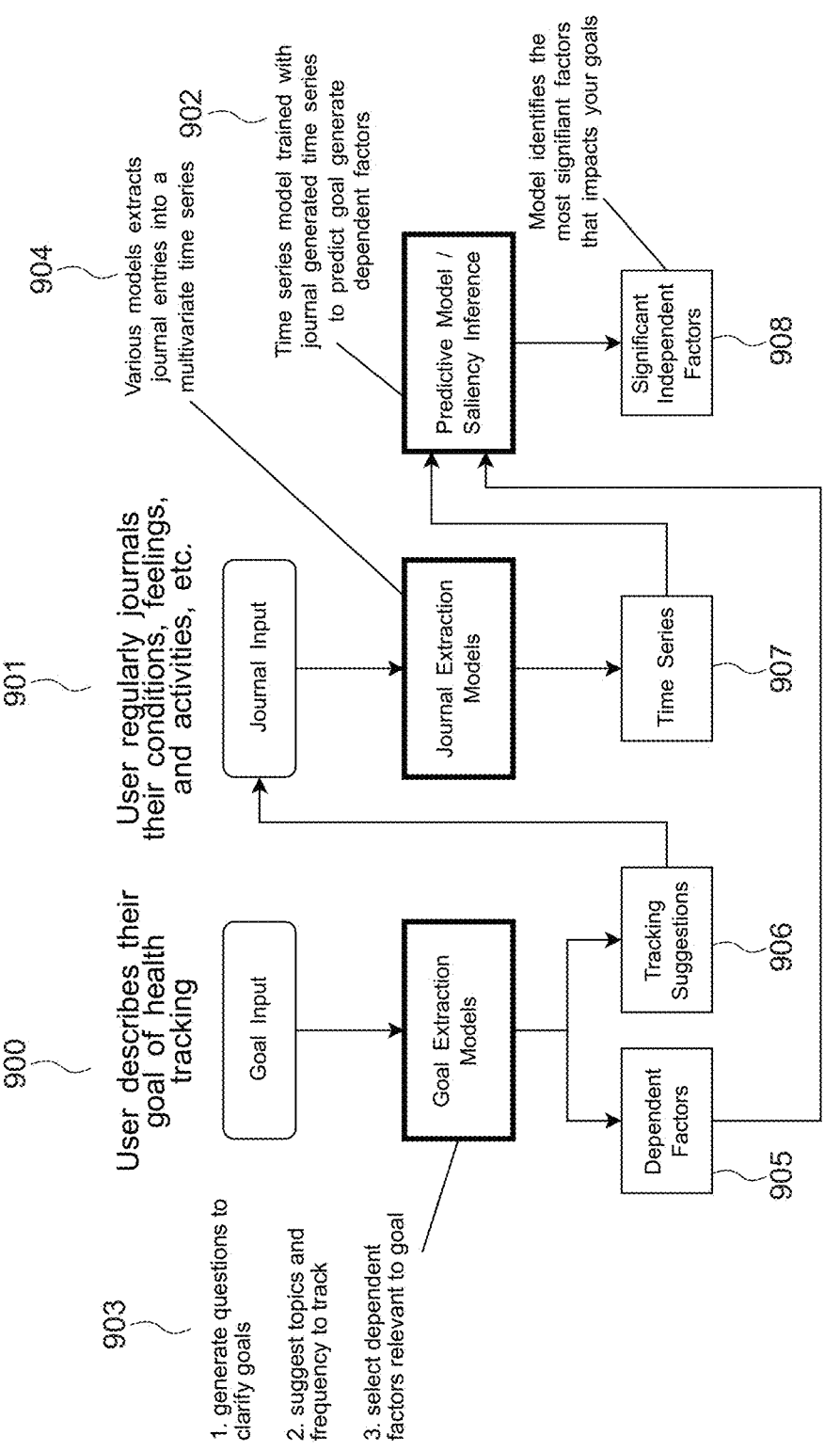
FIG. 9 shows an embodiment of a method for the three-phase system.

Self-monitoring system 100 may include a trained time-series computational model 106, 504, 509, 902 based on the outcome 905 the user wants to target. This model can be used to interpret correlated factors and underlying patterns in the time series, providing a more comprehensive and personalized understanding of the individual's well-being. This concept is illustrated in FIG. 9 Determining correlations involves employing saliency analysis within time series data 908. This approach pinpoints the key variables within the time series that are significant in predicting the conditions of interest to the user. An example of this technique is the Temporal Fusion Transformer; however, our exploration includes a variety of other methodologies.

Self-monitoring system 100 may use the insights from the saliency analysis to identify correlations between the important features and the predicted outcomes to help understand how different variables are related to the conditions the user is interested in. Utilizing this, self-monitoring system 100 may be used to forecast future events and provide insights into which factors are most strongly correlated with the outcomes of interest, allowing for a deeper understanding of the underlying patterns in the time series data.

These three methods provide a range of options for the user to analyze and gain insights from their self-monitoring data, ensuring that they can choose the approach that works best for them.

Self-monitoring system 100 may capture a goal of the user in self-monitoring in the natural language and based on intent, suggest the activities and conditions to track 906. Self-monitoring system 100 uses large language models 102, 903 to generate a series of additional questions to clarify the stated goal 903. Self-monitoring system 100 uses large language models 102, 903 to identify activities and conditions of interest and follow-up frequency that the user should write about their experience. Self-monitoring system 100 prompts the user to write about these experiences based on time and frequency identified in the previous step 906. Self-monitoring system 100 uses large language models 102 to identify additional or modify existing activities and conditions of interest, and follow-up frequencies based on new entries. Self-monitoring system 100 leverages a prior profile of goals of the user and tracking intent to suggest additional topics for tracking, to prompt for greater detail on previous input, and to generate time-based prompts designed to solicit additional user input.

During use, self-monitoring system 100 provides a conversational interface and/or chronological journal entry allowing the user to capture their experiences and activities using natural language, based on their entry, self-monitoring system 100, 904 extracts analyzable data entities to construct a time-series 907.

During this method, self-monitoring system 100 splits up text entry into descriptions of multiple events based on current time 601, and contextually from the text entry, and assigns a timestamp to these events. Self-monitoring system 100 extracts named entities from these events and infers event time based on the current time and context from the text entry to create entries into a multivariate time series, Self-monitoring system 100 directs and prompts a conversation using a chatbot to elaborate on input or suggest the activities or the conditions to track based on previously expressed goals. The goals allow the system to identify what are the predictive factors to train the saliency model on 905. For example, if the user's goal is to control their eczema, this will inform the model to infer which factors most affect their symptoms that relate to the skin. While a weight loss goal will inform the model to train to predict weight measurements.

As discussed, AI chatbot 201 and/or self-monitoring system 100 may utilize large language models 102 and were pre-trained with extensive datasets, including books, websites, and other text sources to learn language patterns, grammar, fact. Once trained, utilize large language models 102 to generate coherent and contextually relevant text based on the prompts they receive from user 121 and can maintain a dialogue with user 121, providing responses that are contextually relevant to the input they receive. Large language models 102 may utilize a number of machine learning models such as neural networks having layers of interconnected nodes that can process input data and produce output. For example, an encoder-decoder neural network. The encoder starts by converting each word in the input text into a vector using an embedding layer. These embeddings capture the semantic meaning of each word. Positional encodings may be added to the input embeddings to provide information about the position of each word in the sequence.

A multi-head self-attention mechanism may then be used to allow the model to weigh the importance of different words in the input sequence differently. Each 'head' in the multi-head attention mechanism performs attention independently, allowing the model to capture different types of relationships between words. After the self-attention mechanism, layer normalization is applied. Also, residual connections are used, which means the input of each sub-layer is added to its output. This helps in mitigating the vanishing gradient problem in deep networks.

Each layer of the encoder may also include a position-wise feed-forward neural network, applied to each position separately and identically. This network includes fully connected layers with activation functions. Multiple such encoder layers are stacked on top of each other. Each layer operates on the output of the preceding layer.

During use, the text input is converted into a set of vectors through the embedding and positional encoding steps. These vectors are then passed through the multi-head self-attention mechanism, where the model learns to focus on different parts of the input sequence. The output of the attention mechanism is then normalized and passed through the feed-forward neural network. The process is repeated for each encoder layer, with the output of one layer feeding into the next. The final output of the transformer encoder is a set of vectors, one for each input token.

Heuristics and Large Language Models (LLMs) may also be used to clean up data by automating the process of identifying and rectifying errors, inconsistencies, and other issues in datasets. Heuristics may be used to define rules and checks for data validation whereby data may be stored in a specific format. Heuristics may also verify that the data types of values in the dataset match the expected data types whereby the process may be repeated or data eliminated if it deviates too far from the expected types.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for self-monitoring comprising:

one or more processors and a non-transitory computer-readable storage medium storing instructions that, when executed by the one or more processors, implement:

a time and topic-aware pipeline wherein the system prioritizes timestamp assignment by: utilizing specific date/time information when mentioned or attached to the entry, calculating timestamps relative to present time when relative time or date parts are mentioned or attached to the entry, and using present time as the timestamp when additional time information is not present in the entry;

utilizing neural networks having layers of interconnected nodes to weigh importance of different words in an input sequence differently;

a conversational interface or chronological journal entry mechanism configured to:

receiving, by the one or more processors, natural language input from a user;

segmenting, by the one or more processors, the natural language input into multiple events based on temporal references relative to a current time, selecting, by the one or more processors, one or more specialized models based on detected topics within the segmented events;

extracting, using the specialized models, named entities and corresponding attributes from the segmented events; organizing the extracted named entities and attributes into a multi-level hierarchical data structure comprising: a first level containing journal entry metadata and a second level containing chronological entries of per-topic extracted entities, and additional levels containing topic-specific details;

and organizing the extracted named entities and attributes into the multi-level hierarchical data structure wherein a top tier encompasses journal metadata, subsequent layers encompass the per-topic extracted entities, with the named entities representing single or multiple attributes, and classifications autonomously generated through large language model while favoring recognition of standard categories;

generating a multivariate time series based on the organized extracted named entities and attributes, wherein the time series is configured to adjust timestamps based on a detected location of the user and time zone, aligning for recorded events with user's daily routines specifically with models trained or prompted with an adjusted time series using a local time of the event;

providing outputs of the multivariate time series in a form graphical representations displayed on (1) a user interface of a computing device for visual overview of self-monitoring data, (2) time series data delivered as payload to authenticated API or function calls for external system integration, and (3) time series data indexed and stored in a queryable database or file system for long-term storage and retrieval".

2. The system of claim 1, wherein the system selects one or more specialized prompts or fine-tuned large language models or external APIs to interpret or augment different entity types.

3. The system of claim 1, wherein the system enables the user to modify previously captured named entity structures with additional natural language input.

4. The system of claim 1, wherein the system enables the user to store their journal entries and current interaction state within a computing device instead of a remote server.

5. The system of claim 1, wherein the system integrates additional data into the time series, such as data from health tracking devices, GPS location, photos, weather air quality, and other external sources.

6. A system for self-monitoring comprising: one or more processors and a non-transitory computer-readable storage medium storing instructions that, when executed by the one or more processors, implement:

a time and topic-aware pipeline for constructing a multivariate time series from natural language input by initially segmenting journal entries based on referenced time in relation to present moment;

receiving the natural language input describing one or more tracked data points of a state or activity or event of a user through a conversational interface;

parsing the natural language input using a large language model utilizing neural networks to identify discrete data points; for each identified discrete data point: determining a timestamp based on local time of input and temporal expressions in the natural language input; extracting structured data using specialized large language models trained; generating time series data points linking the tracked data points to the determined timestamp; and vectorizing the generated time series data points into numerical representations for machine learning tasks without personally identifiable data; and providing outputs of the multivariate time series.

7. The system of claim 6, wherein the non-transitory computer-readable storage medium further implements: providing outputs of the multivariate time series in a form of graphical representations displayed on a user interface of a computing device for visual overview of self-monitoring data.

8. The system of claim 6, wherein the non-transitory computer-readable storage medium further implements: providing outputs of the multivariate time series in a form of time series data delivered as payload to authenticated API or function calls for external system integration.

9. The system of claim 6, wherein the non-transitory computer-readable storage medium further implements: providing outputs of the multivariate time series in a form of time series data indexed and stored for long-term storage and retrieval.

10. The system of claim 6, wherein vectorizing the generated time series data points comprises: converting text-based features into numerical representations; normalizing the numerical representations; and generating embeddings that preserve semantic relationships while removing personally identifiable information.

11. The system of claim 6, wherein the non-transitory computer-readable storage medium further implements: receiving a natural language query about historical events; generating query embeddings from the natural language query; comparing the query embeddings against stored time series embeddings; and returning matching events based on semantic similarity.

12. The system of claim 6, wherein the non-transitory computer-readable storage medium is further configured to identify one or more salient independent variables that contribute most to outcomes of interest based on previously received goals or ad-hoc selections for exploration.

13. The system of claim 6, wherein the non-transitory computer-readable storage medium further implements: detecting anomalies in the time series data using historical patterns; generating alerts when detected anomalies exceed configured thresholds;

adapting the thresholds based on feedback about alert accuracy; and storing the adapted thresholds to improve future anomaly detection.

14. A system for self-monitoring comprising:

one or more processors; and a non-transitory computer-readable storage medium storing instructions that, when executed by the one or more processors, are configured to:

receive, via a conversational interface or chronological journal entry, natural language input describing user experiences and activities;

utilizing a time and topic-aware pipeline to extract analyzable data entities from the natural language input to construct a time series by initially segmenting journal entries based on referenced time in relation to a present moment, and subsequently analyzing data from each segmented portion by specialized models or prompts designed to extract pertinent information to construct the time series;

organize the extracted data entities into a multi-level hierarchical data structure wherein the system is configured to categorizes and structure responses into a multi-level hierarchical format, wherein a top tier encompasses journal metadata including location, time of entry, topics of entry, sentiment, and associated content, by: generating a first level including chronologically interpreted journal entries with timestamps, classification types for the activities and conditions, and top level metadata;

generating subsequent layers including extracted specific entities having predefined field types, dynamically generated new fields based on identified novel entities autonomously generated through a large language model while favoring recognition of standard categories and nested entity relationships derived through specialized data extraction, wherein the specialized data extraction models are selected based on relevance to analyzed text, and individual records trigger multiple models to parse and distill information, wherein the chronologically interpreted journal entries trigger further specialized data extraction to generate subsequent nested entities within the hierarchical data structure, wherein the system comprises an encoder-decoder neural network configured to:

convert words in the natural language input into vectors using embedding layers that capture semantic meaning;

apply positional encodings to provide sequence position information;

utilize multi-head self-attention wherein each head independently weighs importance of different words in the input sequence to capture relationships between the words;

apply layer normalization and residual connections to mitigate vanishing gradient problems;

include feed-forward neural networks with fully connected layers and activation functions; and stack multiple encoder layers wherein each layer operates on output of a preceding layer to produce the vectors for extraction of named entities and corresponding attributes.

15. A system for self-monitoring comprising:

one or more processors and a non-transitory computer-readable storage medium storing instructions that, when executed by the one or more processors are configured to receive, via a conversational interface or chronological journal entry, natural language input describing user experiences and activities of a user;

utilizing a time and topic-aware pipeline to extract analyzable data entities from the natural language input to construct a time series;

facilitating searching and querying of journal entries on a user interface presented to user on a computing device, using three data sources: user-entered text, generated vector embeddings, and extracted metadata, which enhances capabilities of the system locate the journal entries through a combination of literal text queries, semantic content similarity, and metadata attribute;

enable searching and asking questions using natural language of the journal entries using a combination of the user-entered text, vector embeddings, and the extracted metadata; and rank results based on contextual similarity and relevance to a query of the user using a combination of fuzzy text search, vectorized semantic matching, and metadata attribute filtering, wherein the combination of search methods broadens scope and improves accuracy of search functionality within the system;

wherein the system comprises a neural network configured to:

convert each word in the natural language input into a vector using an embedding layer that captures semantic meaning of each word;

add positional encodings to input embeddings to provide information about position of each word in a sequence;

apply a multi-head self-attention mechanism wherein each head performs attention independently to allow ad model to weigh importance of different words in the input sequence differently and capture different types of relationships between words;

apply layer normalization and residual connections wherein input of each sub-layer is added to its output to mitigate vanishing gradient problems in deep networks;

include position-wise feed-forward neural networks applied to each position separately and identically, the networks including fully connected layers with activation functions; and stack multiple encoder layers on top of each other, wherein each layer operates on output of a preceding layer;

wherein during operation:

the natural language input is converted into a set of vectors through embedding and positional encoding steps;

the vectors are passed through the multi-head self-attention mechanism where the model learns to focus on different parts of the input sequence;

output of the attention mechanism is normalized and passed through the feed-forward neural network;

wherein the process is repeated for each encoder layer with output of one layer feeding into a next layer; and final output of the encoder is the set of vectors corresponding to each input token for extraction of named entities and corresponding attributes.

\* \* \* \* \*